US010108918B2

(12) United States Patent
Palan et al.

(10) Patent No.: US 10,108,918 B2
(45) Date of Patent: Oct. 23, 2018

(54) METHOD AND SYSTEM FOR INFERRING RISK OF DATA LEAKAGE FROM THIRD-PARTY TAGS

(71) Applicant: Acxiom Corporation, Little Rock, AR (US)

(72) Inventors: Vivek Palan, San Francisco, CA (US); Paul Owen, Bend, OR (US); Frank Ledo, Berkeley, CA (US); Ben Jolitz, Los Gatos, CA (US)

(73) Assignee: Acxiom Corporation, Conway, AR (US)

( * ) Notice: Subject to any disclaimer, the term of this patent is extended or adjusted under 35 U.S.C. 154(b) by 565 days.

(21) Appl. No.: 14/478,714

(22) Filed: Sep. 5, 2014

(65) Prior Publication Data

US 2015/0082426 A1 Mar. 19, 2015

Related U.S. Application Data

(60) Provisional application No. 61/879,909, filed on Sep. 19, 2013.

(51) Int. Cl.
| | |
|---|---|
| *G06Q 10/06* | (2012.01) |
| *H04L 29/06* | (2006.01) |
| *G06Q 30/02* | (2012.01) |
| *G06F 21/51* | (2013.01) |
| *G06F 21/57* | (2013.01) |

(52) U.S. Cl.
CPC ......... *G06Q 10/0635* (2013.01); *G06F 21/51* (2013.01); *G06F 21/577* (2013.01); *G06Q 30/02* (2013.01); *H04L 63/1433* (2013.01); *H04L 63/1466* (2013.01); *G06F 2221/2119* (2013.01)

(58) Field of Classification Search
None
See application file for complete search history.

(56) References Cited

U.S. PATENT DOCUMENTS

| | | | |
|---|---|---|---|
| 7,890,627 | B1 | 2/2011 | Thomas |
| 7,921,089 | B2 | 4/2011 | Kailash et al. |
| 8,312,085 | B2 | 11/2012 | van Riel |
| 8,468,602 | B2 | 6/2013 | McDougal et al. |

(Continued)

FOREIGN PATENT DOCUMENTS

| | | |
|---|---|---|
| EP | 2570959 | 3/2013 |
| WO | WO2012057737 | 5/2012 |

OTHER PUBLICATIONS

Malsoru, V; Bollam, N.; Review on Data Leakage Detection; International Journal of Engineering Research and Applications (IJERA); vol. 1, Issue 3, pp. 1088-1091.

(Continued)

*Primary Examiner* — Esther B. Henderson

(57) ABSTRACT

A method and system for assessing the data leakage threat associated with third-party tags on a particular website, such as a content publisher site, is assessed by mimicking a standard web browser. Each third-party tag on the site is identified and investigated in a hierarchical manner, and a data leakage threat score is assigned to each third-party tag based on certain attributes associated with the tag and the resource linked by the third-party tag. A cumulative data leakage threat score is then calculated to determine if the site is a data leakage threat, such as a threat for misuse of a consumer's data.

28 Claims, 3 Drawing Sheets

(56) References Cited

U.S. PATENT DOCUMENTS

| | | | |
|---|---|---|---|
| 8,516,591 | B2 | 8/2013 | Fly et al. |
| 8,769,695 | B2 * | 7/2014 | Richards ............... G06F 21/552 |
| | | | 726/22 |
| 2005/0060643 | A1 | 3/2005 | Glass et al. |
| 2006/0020510 | A1 * | 1/2006 | Vest ....................... G06Q 30/02 |
| | | | 705/14.52 |
| 2008/0289041 | A1 | 11/2008 | Jarvis et al. |
| 2010/0125911 | A1 | 5/2010 | Bhaskaran |
| 2010/0186088 | A1 | 7/2010 | Banerjee et al. |
| 2010/0212010 | A1 | 8/2010 | Stringer et al. |
| 2010/0281536 | A1 * | 11/2010 | Richards ............... G06F 21/552 |
| | | | 726/22 |
| 2011/0035805 | A1 | 2/2011 | Barkan et al. |
| 2011/0239306 | A1 | 9/2011 | Avni et al. |
| 2011/0289582 | A1 | 11/2011 | Kejriwal |
| 2012/0210388 | A1 | 8/2012 | Kolishchak |
| 2012/0311703 | A1 | 12/2012 | Yanovsky et al. |
| 2013/0097706 | A1 | 4/2013 | Titonis et al. |
| 2013/0117185 | A1 | 5/2013 | Collison et al. |
| 2013/0198840 | A1 | 8/2013 | Drissi et al. |
| 2013/0212638 | A1 | 8/2013 | Wilson |
| 2015/0033341 | A1 * | 1/2015 | Schmidtler ............. H04L 63/14 |
| | | | 726/23 |

OTHER PUBLICATIONS

Harkous, H; Semantics and Privacy Aware Data Sharing in the Personal Cloud; Edic Research Proposal, May 5, 2009.

Mattsson, U; A Multi Layered Approach to Prevent Data Leakage; AURX Database and Network Journal v. 38, N. 1, p. 9(6); Feb. 1, 2008.

Menahem, E; Scholar, A; Rokach L; Elovici, Y; Securing Your Transactions: Detecting Anomalous Patterns in XML Documents; arXiv: 1209.1797v3; Jun. 5, 2013.

Yoshihama, S; Mishina, T; Matsumoto, T; Web-based Data Leakage Prevention; IBM and Graduate School of Environmental and Information Sciences, Yokohama National University.

International Patent App. No. PCT/US2014/055494 Search Report and Written Opinion of the International Searching Authority; dated Nov. 24, 2014.

International Search Report for International Application No. PCT/US2014/055494 (dated Nov. 24, 2014).

Extended European Search Report for Application No. 14845878.9 (dated Mar. 29, 2017).

* cited by examiner

METHOD AND SYSTEM FOR INFERRING RISK OF DATA LEAKAGE FROM THIRD-PARTY TAGS

CROSS-REFERENCE TO RELATED APPLICATIONS

This application claims the benefit of U.S. provisional patent application No. 61/879,909, filed on Sep. 19, 2013, and entitled "Method and System for Inferring Risk of Data Leakage from Third-Party Tags." Such application is incorporated herein by reference in their entirety.

STATEMENT REGARDING FEDERALLY SPONSORED RESEARCH OR DEVELOPMENT

Not applicable.

BACKGROUND OF THE INVENTION

In recent years, website advertisers and publishers have begun adding tracking code from third-party websites in order to better understand who their users are, and further to monetize these insights into their customers. Monetization can take numerous forms, including the placement of display advertisements on a content publisher's own website, or by targeted advertising using data aggregated from a number of websites. This data is normally exchanged and sold by means of the real-time or offline synchronization of anonymized cookie information. The types of code used for this purpose may include web "pixels," that is, objects embedded in a web page, and JavaScript tags. All such code may generally be referred to as third-party tags.

As the digital advertising industry has grown, so have the number of third-party tags placed on any given site. As a representative example, the television network website cbs.com has at a certain point had at least eleven third-party tags firing on the homepage during a web browser's visit, with many more on other pages within the overall site. Since a website may partner with or terminate its relationships with one or more of these partners over time, the large number of third-party tags from different companies means that keeping each tag up to date has become difficult.

Because of the widespread use of third-party tags, another issue that has arisen is the protection of a website's user data from unauthorized use or malicious activity, which is commonly known as data "leakage." Even when the online content publisher has a relationship with a third-party tracking company, the publisher may have restrictions on how its user's data can be utilized. Third-party tag requests can be forwarded from third parties to their secondary partners and so on, without a website owner's knowledge or permission, or even the knowledge that such forwarding is taking place. Malicious activity using third-party tags may include extraction of data from a web page; maliciously modifying content of a web page; performing an activity that is intended to harm the end user or the website owner; the presence of a Trojan horse that is automatically and surreptitiously downloaded by visiting the webpage; and the hiding of website re-direct activities in order to avoid the user realizing that the web browser has been redirected to an unsafe or potentially unsafe site.

Consumer web browsers have become extremely complex in order to process and display modern web pages, which may be composed of many independent pieces belong to a number of different parties and hosted at different servers with different IP addresses. Any web browser must be able to handle a request for a single web document and subsequent requests for external resources required by that document. Some resources are programs, such as those written in the webpage scripting language JavaScript, which will run within the context of the web browser and terminate only when the user closes the browser or navigates to a different document. Given this complexity and the resulting difficulty of understanding what occurs as a user browses the web, most users are technically unable to investigate this issue, and simply expect that first party and third party players behave appropriately, with potentially damaging results when that expectation is violated.

Many consumers and businesses wish to take advantage of increasingly accurate metrics, analytics and targeted advertising. The data collected to enable such offerings has in turn become extremely valuable. Due to a lack of industry oversight and comprehensive safeguards, unscrupulous companies may use third-party tags to forward information about a consumer visiting a website without obtaining permission from the client website (such as a content provider) with which they are partnered. Furthermore, malicious entities may want to masquerade as legitimate entities in hopes of harvesting sensitive information about a consumer. Third-party tags may facilitate unsafe or unexpected behavior, which may include the loading of off-site scripts, collection of sensitive data, participation in denial-of-service (DoS) attacks, or making contact with questionable domains for undisclosed tracking of the consumer's online behavior.

Due to the nature of JavaScript in particular, legitimate and malicious third-party tags are difficult to analyze piecemeal, forcing users and the publishers who provide content to these users to choose between security and convenience. To make matters worse, some third-party JavaScript tags will load additional third-party JavaScript tags in a chain of scripted calls, reducing the practicality of human directed analysis significantly. It may be seen that it would be highly desirable to both advertisers and content publishers to have a clear understanding of what actions these third-party tags, such as JavaScript tags and pixel tags, are taking on their websites, in order that they may take appropriate action in order to protect the privacy of their users. Consumers likewise would find this understanding highly desirable in order to safeguard their privacy and to allow them to navigate various web pages without fear that their information is being misused or misdirected.

References mentioned in this background section are not admitted to be prior art with respect to the present invention.

BRIEF SUMMARY OF THE INVENTION

The present invention is an apparatus and method to determine if data leakage is occurring through a particular web domain. In various embodiments, the invention mimics common web browsers and visits client websites (such as content publishers with third-party advertisements) in a manner that appears to the website software to be similar to a typical user. Unlike the standard web browser, however, the software records requests for information and programmatic operation in order to construct a threat score. The system presents the appearance of a consumer using a web browser in order to monitor and observe activity taking place with respect to JavaScript tags, pixel tags, and the like. The system creates a taxonomy of first- and third-party requests in order to construct a hierarchical model that ascribes provenance to each resource. The results of the analysis are, in certain embodiments, made available as a cumulative threat score. The threat scores are calculated based upon various attributes that are assigned to each third-party tag identified.

The various embodiments of the invention may be seen to provide transparency, such that the website owner is aware of the likelihood that a partner is dealing with other companies in a suspect fashion. It facilitates the privacy compliance for a website owner, such that the website owner can block or terminate partners that do not comply with its own privacy standards or applicable laws or regulations. It also allows for better monetization of the audience for a content publisher by avoiding the user being exposed to random advertisements, such that the user will be more likely to respond to relevant advertisements on the website itself, thereby increasing conversion rates. The website visitor will also be more likely to trust the website with his or her own data. The website owner can thus be informed of the actions of third parties interacting with its website; evaluate the relative safety or threat presented by third-party tags on its website; unmask previously hidden third parties that may be operating without the knowledge of the client; and determine performance impacts to its website caused by the actions of third-party tags.

These and other features, objects and advantages of the present invention will become better understood from a consideration of the following detailed description of certain embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In various embodiments, the invention is a method and system for inferring whether data leakage is occurring on a website with third-party tags, including but not limited to pixels and JavaScript tags. It is important to note that the mere presence of a third-party tag, and forwarding (or "piggybacking") that results when the code calls another server, is not itself an indication of data leakage. There may be legitimate reasons to forward HTTP requests to multiple partners. The invention analyzes a webpage in a manner that appears to the website and its partners as if the webpage is interacting with an ordinary consumer's web browser, but the analysis is used to determine a data leakage threat score, which is then used to determine whether leakage is likely to be occurring at the website.

Figure 1:
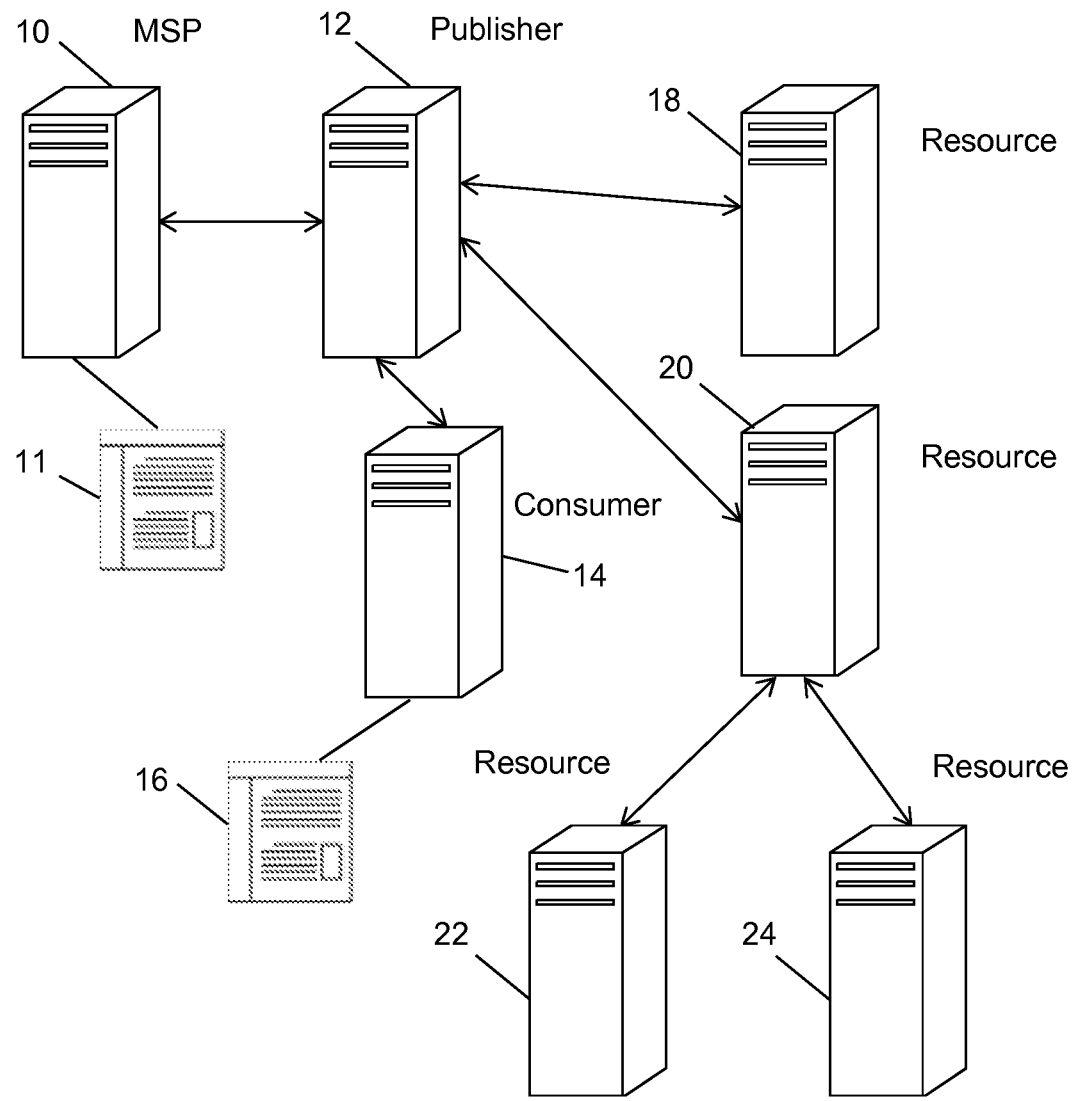
FIG. 1 is a diagram showing a networked system according to certain embodiments of the present invention.

Referring now to FIG. 1, a system of interconnected computing devices is shown as may, for example, be various types of devices connected to each other across the Internet. Although each is generally connected across the Internet, the actual communications taking place between individual components is shown by arrows in FIG. 1 for clarity. Marketing services provider (MSP) server 10 hosts the software that, together with computer hardware, results in specially programmed computer hardware that implements the method and system described herein. Specifically, MSP server 10 includes routines 11 to mimic a standard computer browser in order to analyze websites for data leakage, as will be described following. MSP server 10 communicates with a content publisher server 12, which hosts the website of interest. This website may be, for example, a news, entertainment, or other information site, a retail site, or any of many other sites that would be of interest to various types of consumers or individuals. This website is designed to be accessed through consumer computer 14, which runs web browser 16 so that a consumer may interact with the webpage hosted at publisher server 12. Consumer computer 14 may be a desktop computer, a laptop computer, a smartphone, a tablet, or any other electronic device that allows for a connection to a website or other web content as hosted by publisher server 12. Third-party tags on the website hosted at publisher server 12 redirect to resource servers 18 and 20. Since third-party tags may further redirect to subsequent third-party tags, in this particular example resource server 20 redirects to resource servers 22 and 24, which are thus two steps removed from the consumer accessing publisher server 12 and the website hosted at publisher server 12 through consumer computer 14. This configuration of FIG. 1 is only one example of many possible variations, with any number of publisher servers, consumer computers, and resource servers possible in various embodiments and configurations, with any number of levels of resource servers as material may be redirected from one to the other.

Figure 2:
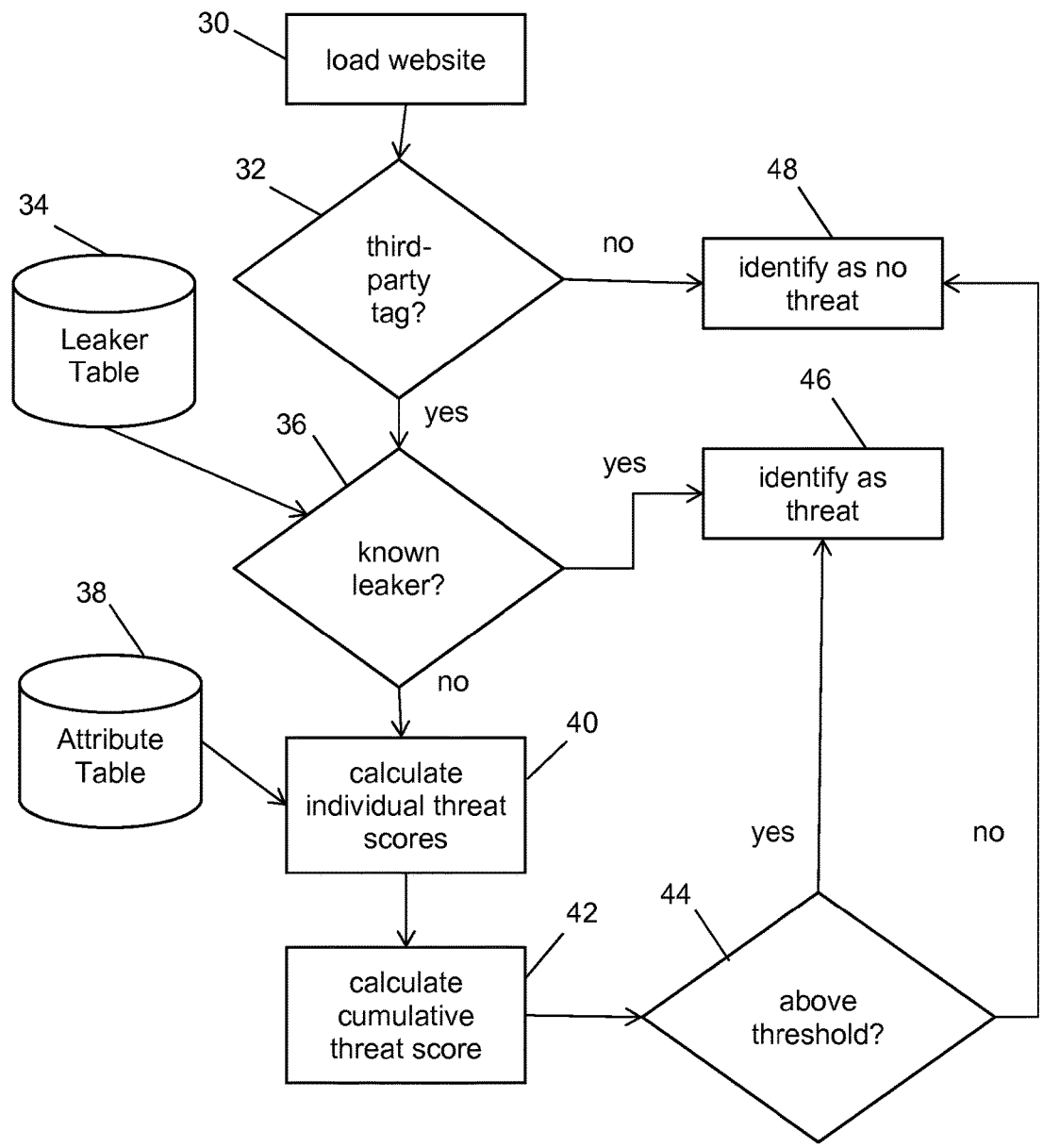
FIG. 2 is a flow chart depicting a process for identifying data leakage according to certain embodiments of the present invention.

Referring now to FIG. 2, the process for determining a threat score—and thus identifying the likelihood of data leakage—may be described using the system of FIG. 1. At step 30, the software executing at MSP server 10 accesses the website at publisher server 12. The software then analyzes whether there are third-party tags on this website at step 32. The software is designed to mimic a standard web browser. If there are no such tags, then the website may be determined to be no threat at step 48, this result is returned by the system, and processing ends.

If there are third-party tags, then at step 36 it is determined whether any of the domain names to which the HTTP request is being forwarded (piggybacked) by the third-party tags are known data leakers. A list of known data leaker domain names is maintained in known leaker table 34, which may be part of or in communication with a data storage device in communication with MSP server 10. If any of these domain names are found in leaker table 34, then the website is determined to be a threat at step 46, this result is returned by the system, and processing ends.

If at step 36 it is determined that none of the domain names to which the third-party tags are forwarded are in the list of known leakers in leaker table 34, then processing moves to step 40 to calculate individual threat scores for each of the redirected domain names. Each such domain name is measured against certain attributes that correlate to data leakage sources. For each attribute checked, if such attribute is found for the domain name then a threat score is assigned based on a value assigned to that attribute in attribute table 38, which is a part of or in communication with MSP server 12. For example, one attribute that may be checked for is whether the third-party tag forwards to a server with a registration date that is less than thirty days old.

Short registration periods could be evidence of a service that has been forced to keep changing hosting services because of fraudulent or disreputable activity. Another example is in indication that third-party tag opens a connection to another site that performs data "scraping" to capture material that is intended to be entered at the original site, such as personal information of a consumer. A third example is a call to open a "pop-up" window to redirect to a different domain.

Each attribute is associated with a particular threat score. Multiple attributes may apply to a single third-party tag. Each third-party tag is analyzed in the manner described herein to determine which attributes match from attribute table 38, and the threat score for each third-party tag is determined as the sum of each of the attribute threat scores for that domain. As shown in FIG. 1, there may be multiple levels of third-party tags from different resource servers, and each tag at each level is analyzed in this manner to calculate a threat score for that attribute. If a third-party tag leads to another third-party tag with a higher threat score, then this higher threat score is assigned to each third-party tag up the chain.

In a particular example of multiple levels of third-party tags being analyzed at step 40, consider a website that has a base third-party tag 1 that directs to a forwarded tag 2 and forwarded tag 3, forwarded tag 2 redirects to a forwarded tag 4, and forwarded tag 4 redirects to a forwarded tag 5. Further consider that there are attributes A, B, C, D, and E that are associated with the threat scores 2, 3, 4, 5, and 7, respectively, higher numbers indicating a more significant threat to privacy or of malicious activity. The following threat scores can then be calculated based on the attributes of each third-party tag as follows, with the threat score in parentheses representing a score inherited from a third-party tag further down in the chain that has a higher threat score:

| Tag | Attributes | Threat Score |
| --- | --- | --- |
| 1 | A | 2 (15) |
| 2 | B, D, E | 15 |
| 3 | B, D | 8 |
| 4 | B, D | 8 (9) |
| 5 | A, B, C | 9 |

Because the attributes and associated threat scores are maintained in attribute table 38, the threat assigned to each attribute may be easily updated as the inferred threat associated with each of the attributes is better understood through experience using the various embodiments of the invention.

Once the individual threat scores are calculated at step 40, then processing moves to step 42 to calculate a cumulative threat score associated with the website at publisher server 12. This process may be as simple as summing each of the individual threat scores for each third-party tag analyzed, or assigning the highest threat score from among the third-party tag individual threat scores. At decision step 44, it is determined whether the cumulative threat score exceeds a certain threshold. For example, this threshold may be set as the top 10% of the websites that have been analyzed using the system executing at MSP server 10. If the threshold is met, then a threat is identified at step 46, this result is returned, and processing ends. If the threshold is not met, then the domain is identified as not being a threat at step 48, this result is returned, and processing ends.

In certain embodiments, the marketing services provider may operate multiple MSP servers 10, each such server being located in a geographically remote location from the other servers. This may be advantageous since the behavior of certain websites may change, and the resulting analysis and threat score calculation thus may change, depending upon the geographic location from which the website is accessed. By utilizing multiple MSP servers 10 in geographically remote locations, the marketing services provider can better analyze the data leakage risk associated with a website as particular to different locations from which a consumer might be accessing the website.

Each of the threat scores in attribute table 38 may be dynamically modified in various embodiments, beginning with a training set of known data leakers and innocuous third-party tags. Some attributes are likely to be common for both innocuous third-party tags and the data leaker tags, such as, for example, setting a cookie on consumer computer 14 through browser 16. Other attributes, however, will be more likely to only be characteristic of data leakers. One manner in which the attribute scores may be determined based on this approach is through a Bayesian inference, which is a statistical technique that is well known in the art. An alternative approach is to consider loose conditions for threats and rebalance the magnitude of the threat scores through an averaged centroid based off of the frequency and aggregate scores relative to each threat. Using a centroid model, one may calculate the ideal median threat percentage based upon the distribution of the threats in all sites, define it as occurring half the time with a set threat score and then scale the scores of other threats around it. One may in this approach define what the highest score should be by doubling the default score for something that occurs half of the time. To de-emphasize more common appearing threats, one may create an inverse relationship between the percent of time a threat is seen against the ideal percentage of the most common threat. The new score ("newscore") of a threat is then defined by:

$$newscore=(1-percent/hp)*highest\_score\_allowed,$$

where:

$$hp=2*(max(score\_percents\_seen)+min(score\_percents\_seen)+median\_percent)/3$$

If the ideal midpoint is defined as the median_percent on a number line from zero to one after being normalized between the lowest and highest percentage seen, then one can multiply it by two to get what the ideal highest percentage of a threat should be if the median were the middle of the distribution.

Figure 3:
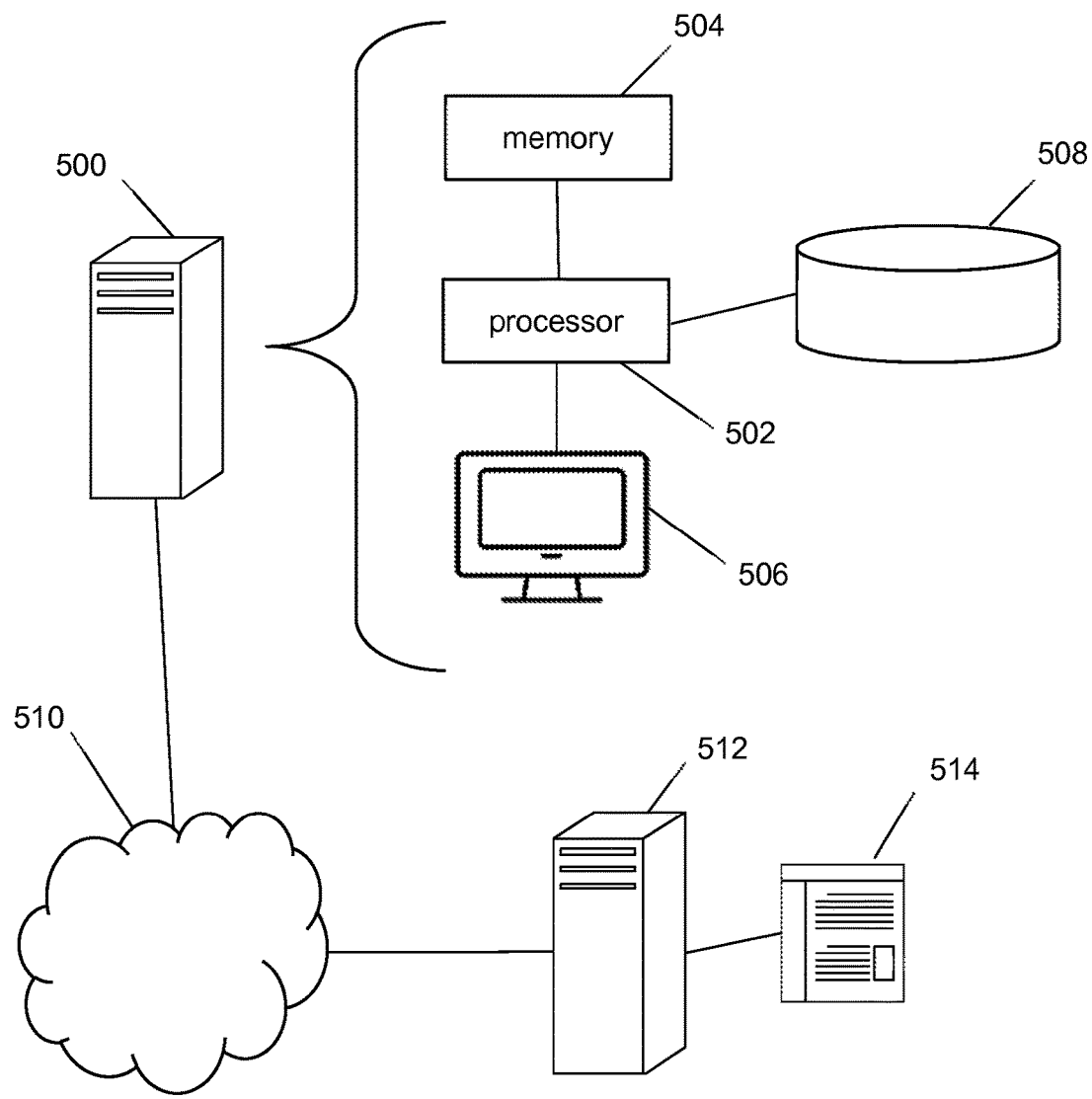
FIG. 3 is a diagram showing a computing device for implementing certain embodiments of the present invention.

The preferred embodiment of the invention is implemented as a number of computing devices 500 as illustrated in FIG. 3, each of which is programmed by means of instructions to result in a special-purpose computing device to perform the various functionality described herein. It may be, for example, the manner in which MSP server 10, publisher server 12, and various resource servers 18, 20, 22, and 24 are implemented as shown in FIG. 1. Computing device 500 may be physically implemented in a number of different forms. For example, it may be implemented as a standard computer server as shown in FIG. 3; as a group of servers; as a personal computer; or as a laptop computer.

Computing device 500 includes microprocessor 502, memory 504, an input/output device or devices such as display 506, and storage device 508, such as a solid-state drive or magnetic hard drive. Each of these components is interconnected using various buses or networks, and several of the components may be mounted on a common PC board or in other manners as appropriate.

Microprocessor 502 may execute instructions within computing device 500, including instructions stored in memory 504. Microprocessor 502 may be implemented as a single microprocessor or multiple microprocessors, which may be either serial or parallel computing microprocessors.

Memory 504 stores information within computing device 500. The memory 504 may be implemented as one or more of a computer-readable medium or media, a volatile memory unit or units such as flash memory or RAM, or a non-volatile memory unit or units such as ROM. Memory 504 may be partially or wholly integrated within microprocessor 502, or may be an entirely stand-alone device in communication with microprocessor 502 along a bus, or may be a combination such as on-board cache memory in conjunction with separate RAM memory. Memory 504 may include multiple levels with different levels of memory 504 operating at different read/write speeds, including multiple-level caches as are known in the art.

Display 506 provide for interaction with a user, and may be implemented, for example, as an LCD (light emitting diode) or LCD (liquid crystal display) monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in computer hardware, firmware, software, and/or combinations thereof. These various implementations may include implementation in one or more computer programs that are executable and/or interpretable on a programmable system including at least one programmable microprocessor 502, which may be special or general purpose, coupled to receive data and instructions from, and to transmit data and instructions to, a storage system, one or more input device, and one or more output device.

The computing system can include clients and servers. In this case, client device 512 runs a web browser 514 in order to access the Internet 510, which allows interconnection with computing device 500. A client and server are generally remote from each other and typically interact through a communication network. For example, publisher server 12 of FIG. 1 may be structured as a server in this configuration and consumer computer 14 as a client device. The relationship of client and server arises by virtue of computer programs running on the respective computers and having a client-server relationship to each other.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for identifying data leakage across an Internet connection, comprising the steps of:
   a. accessing via threat analysis software hosted on at least one marketing services provider (MSP) server an Internet website hosted at a publisher server, wherein the MSP server is configured to mimic a standard web browser such that it appears from the Internet website as if the MSP server is a consumer using the standard web browser to access the Internet website but wherein the MSP server is actually configured to analyze the Internet website for data leakage;
   b. searching the Internet website to identify any third-party tags on the Internet website;
   c. determining whether any of the third-party tags forward requests to subsequent third-party tags, thereby allowing the subsequent third-party tags to piggyback through inspection of the Internet website at the time the Internet website is loaded;
   d. if it is determined that subsequent third-party tags are piggybacking on the Internet website, dynamically calculating an individual threat score associated with each third-party tag found on the Internet website based on use by each third-party tag of any personal information associated with an individual accessing the Internet website;
   e. if individual threat scores are calculated, calculating a cumulative threat score associated with the Internet website based on the individual threat scores; and
   f. if a cumulative threat score is calculated, then determining whether the cumulative threat score is above a threshold threat score, and if so identifying the Internet website as a data leakage threat.

2. The computer-implemented method of claim 1, wherein the Internet website is associated with an Internet domain, and further comprising the steps of:
   a. searching for the Internet domain in a table of known data leaker Internet domains;
   b. identifying the Internet website as a data leakage threat if the Internet domain associated with the Internet website is found in the table of known data leaker Internet domains; and
   c. updating the table of known data leakers if the Internet domain is shared with other websites.

3. The computer-implemented method of claim 2, wherein the step of calculating individual threat scores comprises the step of determining whether an Internet-based resource associated with each third-party tag exhibits any of a plurality of attributes, wherein each attribute is associated with a data leakage threat.

4. The computer-implemented method of claim 3, wherein each attribute is associated with a numerical threat score.

5. The computer-implemented method of claim 4, wherein the individual threat score is calculated as a sum of the threat scores associated with each attribute associated with each third-party tag.

6. The computer-implemented method of claim 5, wherein the cumulative threat score is calculated as a sum of the individual threat scores.

7. The computer-implemented method of claim 1, wherein the threshold is a numerical score that is at least as high as an identified percentage of a plurality of reference cumulative threat scores.

8. The computer-implemented method of claim 1, wherein a second MSP server geographically remote from the MSP server, but connected by the Internet, repeats steps (a) and (b).

9. A computer program product for assessing a risk associated with data leakage on the Internet, the computer program product being stored on a non-transitory tangible computer-readable medium and comprising instructions that, when executed, cause a computer system to:
   a. access via threat analysis software hosted on at least one marketing services provider (MSP) server an Internet website hosted at a publisher server, wherein the analysis software mimics a standard web browser such that the Internet website appears to be accessed in the same manner as it would be accessed by a standard web browser but wherein the MSP server is actually configured to analyze the Internet website for data leakage;
   b. search the Internet website to identify any third-party tag piggybacking, wherein identifying third-party tag piggybacking comprises determining whether any third-party tags forward requests to subsequent third-party tags;
   c. dynamically calculate an individual threat score associated with each instance of third-party tag piggybacking found on the Internet website based on any use by each third-party tag of personal information associated with an individual accessing the Internet website;
   d. calculate a cumulative threat score associated with the Internet website based on each individual threat score; and
   e. if the cumulative threat score is above a threshold threat score, return an indicator that the Internet website is a data leakage threat.

10. The computer program product of claim 9, further comprising instructions that, when executed, cause a computer system to search an Internet domain associated with the Internet website in a table of known data leaker Internet domains, and identify the Internet website as a data leakage threat if the Internet domain associated with the Internet website is found in the table of known data leaker domains.

11. The computer program product of claim 10, further comprising instructions that, when executed, cause a computer system to determine whether a resource associated with each third-party tag exhibits any of a plurality of attributes, wherein each attribute is associated with an Internet-based data leakage threat.

12. The computer program product of claim 11, wherein each attribute is associated with a numerical threat score.

13. The computer program product of claim 12, further comprising instructions that, when executed, cause a computer system to calculate the individual threat score as a sum of the threat scores associated with each attribute associated with each third-party tag.

14. The computer program product of claim 13, further comprising instructions that, when executed, cause a computer system to calculate the cumulative threat score as a sum of the individual threat scores.

15. The computer program product of claim 9, wherein the threshold is a threat score that is at least as high as a set percent of a database of dynamically calculated reference cumulative threat scores.

16. A system for determining a threat of data leakage for an Internet website, comprising:
   a. a marketing services provider (MSP) server configured to access the Internet website in a manner that mimics a standard web browser such that it appears to the Internet website that the MSP server is a consumer using the standard browser but wherein the MSP server is actually configured to analyze the Internet website to identify and investigate any third-party tag piggybacking found on the Internet website, wherein third-party tag piggybacking comprises a third-party tag forwarding requests to at least one subsequent third-party tag;
   b. a leaker table stored in a non-transitory computer-readable medium in communication with the MSP server, wherein the leaker table comprises a plurality of Internet domains known to be data leakers; and
   c. an attribute table stored in a non-transitory computer-readable medium in communication with the MSP server, wherein the attribute table comprises a plurality of attributes for an Internet domain associated with a threat of Internet-based data leakage based on use by any third-party tag of personal information associated with an individual.

17. The system for determining a threat of data leakage across the Internet for a website of claim 16, wherein the attribute table further comprises, for each attribute, a numerical threat value associated with the attribute.

18. The system for determining a threat of data leakage across the Internet for a website of claim 17, wherein the MSP server is further configured to identify each of the attributes from the attribute table associated with each third-party tag found on the Internet website.

19. The system for determining a threat of data leakage across the Internet for a website of claim 18, wherein the MSP server is further configured to dynamically calculate an individual threat score for each third-party tag by summing the numerical threat value for each attribute associated with the third-party tag.

20. The system for determining a threat of data leakage across the Internet for a website of claim 19, wherein the MSP server is further configured to calculate a cumulative threat score by summing the individual threat scores associated with each of the third-party tags on the Internet website.

21. The system for determining a threat of data leakage across the Internet for an Internet website of claim 20, wherein the MSP server is further configured to compare the cumulative threat score to a threshold threat score, and return a threat result if the cumulative threat score is at least as high as the threshold score.

22. The system for determining a threat of data leakage across the Internet for a website of claim 16, further comprising at least one additional MSP server located in a geographically remote location from the MSP server and connected via the Internet and configured to access the Internet website in the manner of a standard web browser but configured to analyze the Internet website to identify and investigate any third-party tag piggybacking found on the Internet website.

23. The method of claim 1, wherein the step of dynamically calculating the individual threat scores associated with each third-party tag comprises a Bayesian inference analysis of attributes associated with a plurality of Internet domains, such that Internet domains with similar attributes to known data leakage Internet domains receive higher threat scores and domains with similar attributes to known non-data leakage Internet domains receive lower threat scores.

24. The method of claim 1, wherein the step of dynamically calculating the individual threat scores associated with each third-party tag comprises the step of considering loose conditions for a set of threats and adjusting a magnitude of the threat scores through an averaged centroid based off of a frequency and aggregate scores relative to each threat.

25. The method of claim 24, wherein the step of dynamically calculating the individual threat scores comprises the step of calculating an ideal median threat percentage based upon a distribution of threats in all Internet websites analyzed.

26. The method of claim 25, wherein an ideal median threat percentage is calculated based upon the distribution of threats in all Internet websites analyzed, and is defined as occurring half the time with a set threat score and then scaling the threat scores of other threats around the ideal medial threat percentage.

27. The method of claim 26, further comprising the calculation of a highest score by doubling a default score for a threat that occurs half of the time.

28. The method of claim 25, wherein more common-appearing threats are de-emphasized in the step of dynamically calculating individual threat scores by creating an inverse relationship between a percent of time a threat is seen against an ideal percentage of the most common threat.

* * * * *